US006691537B2

(12) United States Patent
Tan

(10) Patent No.: US 6,691,537 B2
(45) Date of Patent: Feb. 17, 2004

(54) SPORTSBOARD LOCKING APPARATUS

(76) Inventor: Calvin Conrad Tan, 24892 Via Sonoma, Laguna Niguel, CA (US) 92677

( * ) Notice: Subject to any disclaimer, the term of this patent is extended or adjusted under 35 U.S.C. 154(b) by 0 days.

(21) Appl. No.: 10/080,431

(22) Filed: Feb. 22, 2002

(65) Prior Publication Data

US 2003/0159475 A1 Aug. 28, 2003

(51) Int. Cl.[7] .............................................. E05B 73/00
(52) U.S. Cl. .............................. 70/58; 70/14; 403/315; 441/74
(58) Field of Search ............................... 70/58, 14, 18, 70/19; 403/315, 316, 353; 441/74

(56) References Cited

U.S. PATENT DOCUMENTS

| 2,677,261 | A | * | 5/1954 | Jacobi | 70/14 |
|---|---|---|---|---|---|
| 3,564,632 | A | * | 2/1971 | Bahne, Jr. | 441/79 |
| 3,664,011 | A | * | 5/1972 | Labastrou | 403/315 |
| 4,340,376 | A | * | 7/1982 | Williams | 70/58 |
| 4,680,949 | A | * | 7/1987 | Stewart | 70/14 |
| 4,938,040 | A | * | 7/1990 | Humphreys, Jr. | 70/58 |
| 5,109,683 | A | * | 5/1992 | Cartwright | 70/14 |
| 5,467,617 | A | * | 11/1995 | Huebner | 70/18 |
| 5,582,044 | A | * | 12/1996 | Bolich | 70/58 |
| 5,706,680 | A | * | 1/1998 | Wroble | 70/18 |
| 5,719,731 | A | * | 2/1998 | Harmon | 70/14 |
| 6,418,759 | B1 | * | 7/2002 | Zeren et al. | 70/58 |

* cited by examiner

Primary Examiner—Anthony Knight
Assistant Examiner—Christopher Boswell
(74) Attorney, Agent, or Firm—Raymond Y. Chan; David and Raymond Patent Group

(57) ABSTRACT

A sportsboard locking apparatus for a sportsboard having an attachment channel having an elongated insertion groove indented on an attachment surface of the sportsboard and an engagement groove perpendicular extended along the insertion groove, wherein the sportsboard locking apparatus includes an engagement member having an engaging latch transversely formed at a foot end of an outer surface thereof and a first shackle bore, a locking member having a predetermined thickness and a second shackle bore, and an attachment device for slidably attaching the locking member to the engagement member that limits the locking member to move longitudinally with respect to the engagement member between a locking position and an unlocking position. At the locking position, a lower end of the locking member is positioned overlappedly with the locking latch while the first and second shackle bores are coaxially aligned with each other to form a through shackle bore for retaining and locking the locking latch inside the engagement groove of the attachment channel by filling the insertion groove with a lower portion of the locking member while the first and second shackle bores are exposed outside the attachment channel.

28 Claims, 6 Drawing Sheets

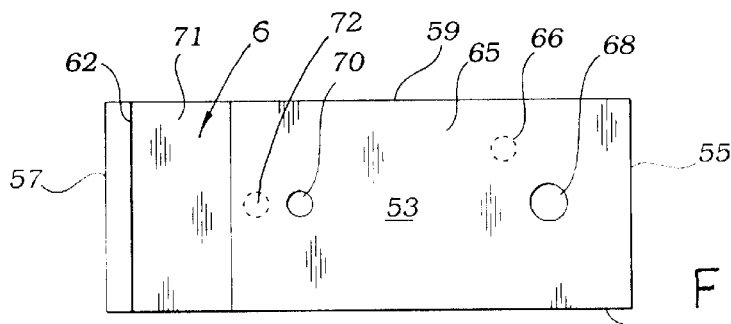
FIG. 2A
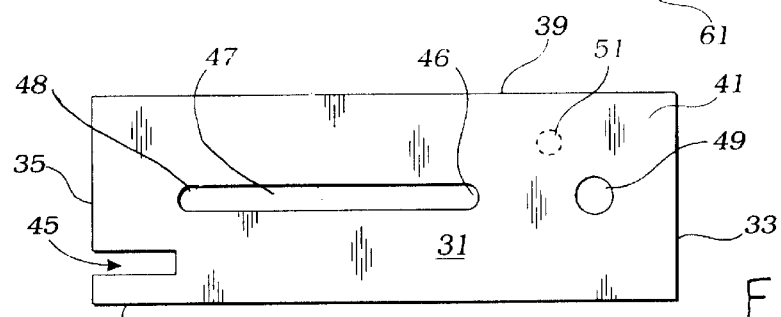
FIG. 2B
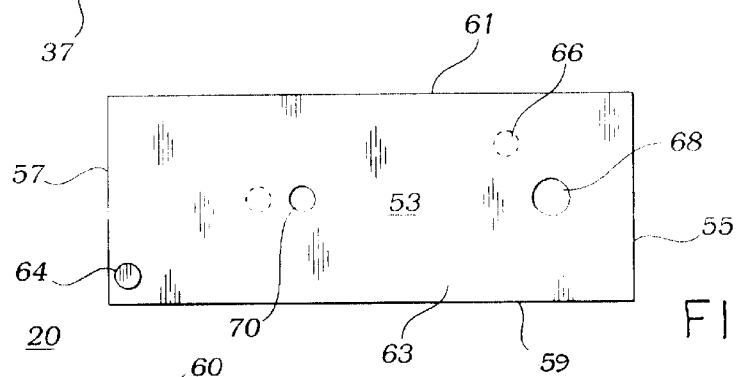
FIG. 2C
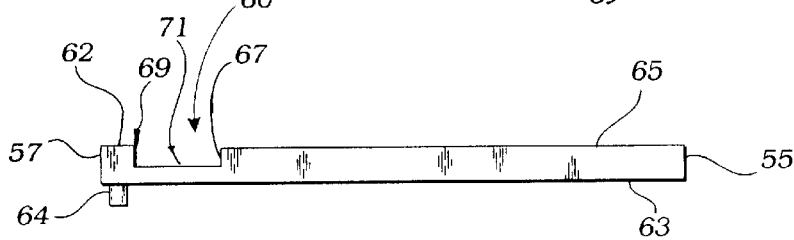
Fig. 3B
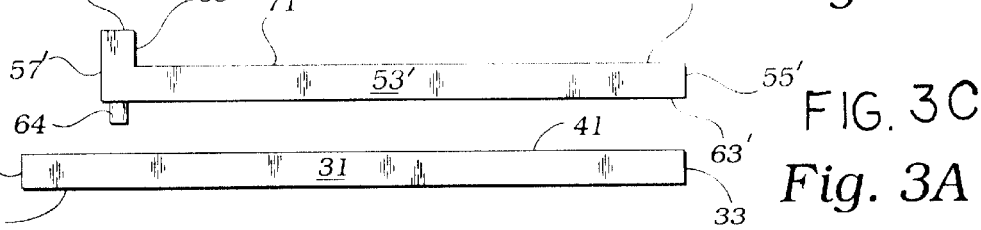
Fig. 3C
Fig. 3A

SPORTSBOARD LOCKING APPARATUS

BACKGROUND OF THE PRESENT INVENTION

1. Field of Invention

The present invention generally relates to sportsboards, such as surfboards snowboards, skis, and skateboards, and more particularly to a sportsboard locking apparatus which is constructed to engage with a recessed channel provided on the sportsboard for locking functions. Although the sportsboards generally include but not limited to snowboards, skis, bicycles, and skateboards, for instructional pruposes the disclosure herein is drawn primarily to water oriented type devices, namely surfboards and the like.

2. Description of Related Arts

Sports and recreational activities involving a board apparatus onto which a recreational user mounts and propels himself and the board along the surface of water and within wave movement has a large consumer and professional base of participation worldwide. The board device utilized in such activities will be collectively referred to herein as a surfboard, although it is understood that the present invention can be applied to a multitude of water oriented sportsboard devices including but not limited to wind surfing/sailing boards, wake riding boards, and the like.

Developments in the surfboard's functional and appearance features; the board's inherent performance; and general quality of materials and manufacture require participants to make substantial monetary investments in the surfboard apparatus. Yet the size, structure and fragility of materials used in the surfboard's manufacture does not lend the surfboard to readily be secured by the activity participant from theft, particularly in the outdoor environment of such recreational activities namely beaches and waterfronts motor vehicle racks, and similar unsecured environments.

Efforts to secure surfboards and the like in these outdoor, recreational environments have included: methods of wrapping substantial planar portions of the surfboard in security cables and the like secured to stationary articles; and to utilize devices intended to be attached to hardware comprising the surfboard itself. These methods and devices have disadvantages including: their being cumbersome to use; prone to dis-engagement by vandals; limited in practicality and effectiveness; and requiring the use of custom surfboard design features, thereby inhibiting their widespread use and effectiveness with surfboards having standard design features.

U.S. Pat. No. 5,119,649 to Spence describes and claims a lock apparatus attachable to a cross bar positioned in a surfboard article, the apparatus locking thereto and including a cable attaching the surfboard to a stationary article. This Spence '649 apparatus utilizes the surfboard's deck plug cross bar and the purpose of which is for attaching a nylon or like cord thereto, the cord serving as a leash type tether upon its attachment to the user's ankle. The apparatus described in the '649 patent functions with little regard for protecting the leash cord tether. This is evident from FIGS. 1–3 and the close quartered interaction of a notched bolt end sliding concentric to an outer casing and interacting with casing end slots to surround the cross bar within the close quartered plug recess.

An additional shortcoming of the '649 apparatus involves the confined space in which a multiplicity of close tolerance, moving parts function namely the harsh and corrosive environments including natural and salt water and abrasive sand and dirt particles. The presence of corrosion and salt residue, dirt or sand within or between the apparatus's moving part surfaces invite wear and inhibited motion or seizing during device operation.

U.S. Pat. No. 5,832,754 to McKenzie discloses a locking device for surfboards including: a hooked end ratchet blade for engaging the surfboard's cross bar, a device plug to engage flush with the deck surface of the board, and a mechanism within the plug to lock the ratchet blade thereby locking the device to the deck plug cross bar and further employing a cable for subsequent attachment of the assembly to a stationary object to prevent theft.

The '754 device relies upon a ratchet blade's slideable engagement of a locking mechanism utilizing the blades teeth. This must be accomplished in the salt water and sand environments the surfboard encounters. Here, corrosion and salt residue, sand, and dirt within or between the device's moving parts invite wear and inhibited motion or seizing during device operation.

Although the McKenzie device recognizes the importance of not interfering with the standard leash cord within and without the cup recess, its notch at the bottom edge of the device plug provides inadequate accommodation to the leash cord as evidenced by the requirement that the bottom surface of the device plug is sufficiently large to completely cover the cup recess to prevent thieves from prying the cup out of the recess.

Both the '649 and '754 devices engage a cross bar located within a recessed cup within the surfboard's body. As such, both locking devices are prone to vandals "rocking" or "alternately twisting" the lock devices that are attached to the boards such that the cross bar and or recessed cup are torn away from the surfboard. In such case, the board is damaged and or un-secured from the devices' security measures.

U.S. Pat. No. 5,934,963 to Frizzell discloses and claims a surfboard fin quick release system for attaching a fin to a surfboard. The system comprises a fin box having a longitudinal channel within the surfboard and a mechanism located on the tang of the fin, which secures the fin into the fin box channel. Frizzel's quick release system does not provide a means to fix the mechanism to the surfboard for security purposes. Thus, the system does not function to protect the surfboard from theft neither by itself nor with ancillary devices. Devices such as McKenzie, Spence or other hook or grip-like functioning devices are incompatible with a Frizzel type structure.

SUMMARY OF THE PRESENT INVENTION

A main objective of the present invention is to provide a sportsboard locking apparatus to overcome the shortcomings of the prior arts with numerous benefits and advantages inherent in the form and function disclosed herein.

Another objective of the present invention is to provide a sportsboard locking apparatus for securely, easily and firmly locking the sportsboard to a hardware for security reasons.

Another objective of the present invention is to provide a sportsboard locking apparatus, wherein the sportsboard locking apparatus is an universally versatile apparatus for securing a broad range of sports and recreational devices which incorporate a "+" or similar cross section feature so that the inventive apparatus can firmly and securely engage the sportsboard and thereby facilitate a method for securing the sportsboard from theft.

Another objective of the present invention is to provide a sportsboard locking apparatus for securing a surfboard from theft by use of a standard design feature of such boards, that is a fin box recess in the body of the surfboard, while overcoming the shortcomings of prior art devices and methods which are susceptible to "rocking" and "alternating twisting" damage inherent in devices attaching to deck plugs and cross-bars.

Another objective of the present invention is to provide a sportsboard locking apparatus, wherein the sportsboard locking apparatus would not adversely affect and cause any damages to other structural and appearance features, such as leash cord tethers as in deck plug engaging security devices.

Another objective of the present invention is to provide a sportsboard locking apparatus, which is simple to manufacture and use while it is easily adapted to standard surfboard designs rather than custom features, and thus inexpensive. The limited number of components involved, eth simple design features, and the limited interaction and assembly requirements of the present apparatus elements carry a modest raw material, manufacture and assembly costs while its adaptability to varied types of surfboards with fin boxes is great without requiring custom features or modifications.

Another objective of the present invention is to provide a sportsboard locking apparatus, which is useful, functions and performs without problems in the environments the surfboard encounters. Given the salt, sand and dirt the environments to which such surfboards are exposed, the present invention features simple part design with limited moving interaction so that these environments are not likely to invite wear, inhibit motion, nor experience seizing of parts during device operation.

In order to accomplish the above objectives, the present invention provides a sportsboard locking apparatus to engage and secure to standard design features on sports and recreational devices, such as sportsboards. In the case of the water oriented device, or surfboard, this feature is namely a fin box within a recessed channel below the outer surface of the surfboard and intimate with and contained within the board's core body. The term surfboard is intended to include but not be limited to board devices useful in activities such as: surfing, wind sailing/surfing; wake riding and the like.

In the preferred embodiment of the present invention, two robust formed members are vertically aligned in intimate contact with each other and slidably joined. The sportsboard locking apparatus firmly and securely engages the standard features of a surfboard, namely a fin box channel. The fin box is located within the body of the surfboard at its rear end and comprises a basic "+" shaped channel which runs from the rear of the surfboard longitudinally toward the board's forward end. The "+" channel is comprised of four grooves, three comprising the "cross" and "top" of the "+" and the fourth comprising the "length" of the "+". The three grooves comprising the cross and top of the "+" are recessed within the board's body. The fourth groove, the length of the "+", begins at the surfboard's outer skin and terminates within the board's body wherein the grooves of the "+"'s cross begin.

The two, slidably joined locking members are vertically lowered toward and into the fin box channel such that the first member engages one half of the fin box channel "+"'s cross groove or inverted "L" and the outer surface of the board. The second member of the apparatus slides with respect to the first member further into the length of the "+" channel and engages the second half of the fin box channel "+" length and the "+" top groove. In this manner, the two locking members consume and firmly engage the fin box channel "+" length, cross and top grooves. Once the primary mechanical elements of the locking apparatus are fixed and intimate within the fin box channel, a padlock and cable or other security device are introduced to and fix the vertical members and provide a means of securing the surfboard to a stationary article via the sportsboard locking apparatus and thereby securing the surfboard from theft.

The apparatus is inexpensive to manufacture and assemble due to the simple design and functioning of its parts. The simple interaction of the apparatus's parts and ancillary security elements, i.e. padlock and security cable, minimizes surfboard engagement steps and makes it easy to use.

These and other objectives, features, and advantages of the present invention will become apparent from the following detailed description, the accompanying drawings, and the appended claims.

BRIEF DESCRIPTION OF THE DRAWINGS

FIG. 2A is a front plan view of an engagement member of a sportsboard locking apparatus according to the above preferred embodiment of the present invention.

FIG. 2B is a plan view of a locking member of the sportsboard locking apparatus according to the above preferred embodiment of the present invention.

FIG. 2C is a rear plan view of the engagement member of the sportsboard locking apparatus according to the above preferred embodiment of the present invention.

FIG. 3A is a side view of the locking member of the sportsboard locking apparatus according to the above preferred embodiment of the present invention.

FIG. 3B is a side view of the engagement member of the sportsboard locking apparatus according to the above preferred embodiment of the present invention.

FIG. 3C is a side view illustrating an alternative mode of the engagement member of the sportsboard locking apparatus according to the above preferred embodiment of the present invention.

DETAILED DESCRIPTION OF THE PREFERRED EMBODIMENT

Referring to FIGS. 2 to 8, a sportsboard locking apparatus according to a preferred embodiment of the present invention is illustrated, wherein while the sportsboard includes a broad range of sports and recreational devices, such as snowboards, skis, skateboards, surfboards and the like. For illustration purpose, an industry standard surfboard 1 having a fin box 10 recessed therein, as shown in FIG. 1, is embodied to illustrate the structural and functional features of the present invention.

Figure 1:
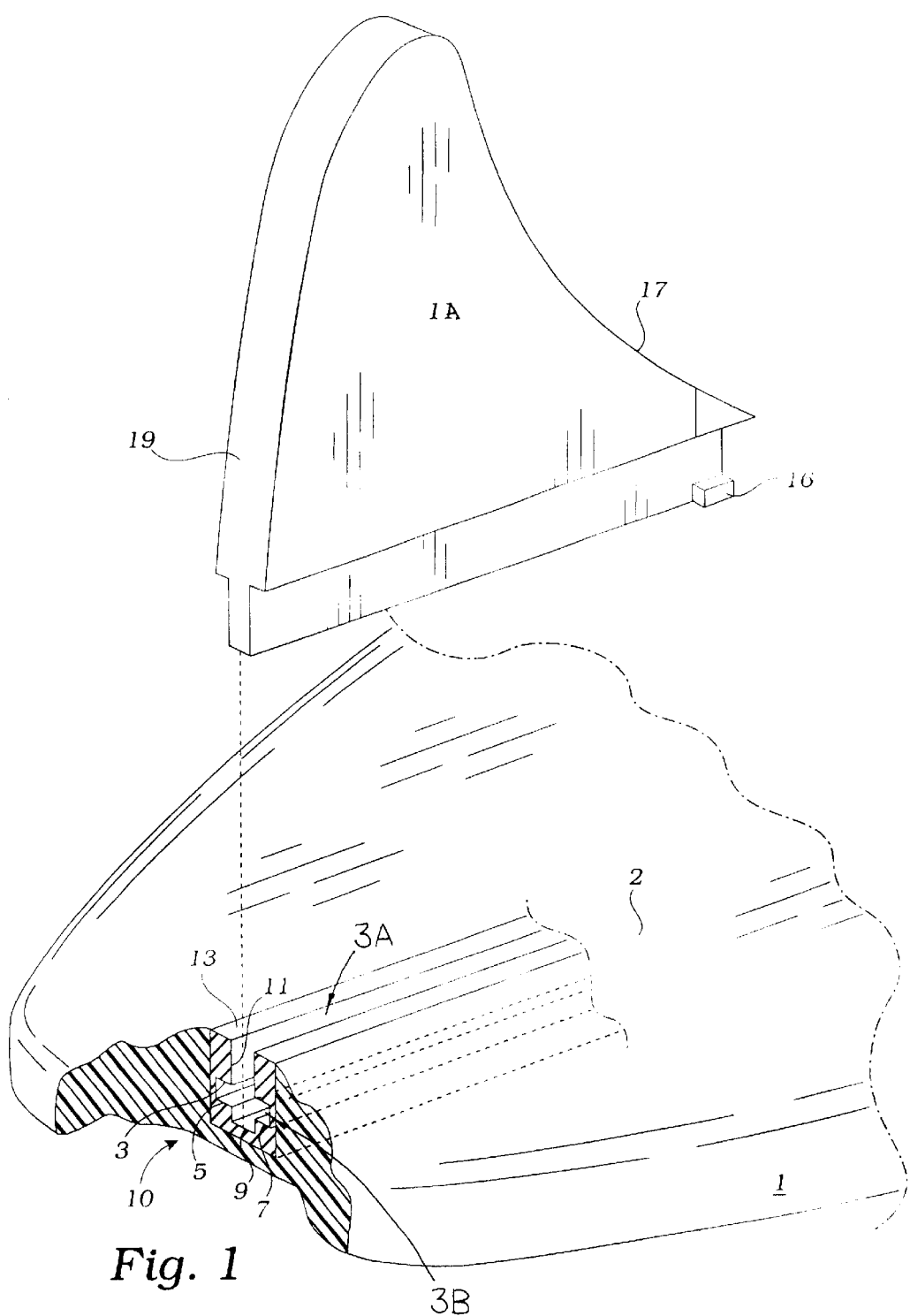
FIG. 1 is partially exploded perspective view of a standard fin box "+" channel within a surfboard body including a standard fin and tang for clarity according to a preferred embodiment of the present invention.

As shown in FIG. 1, the fin box 10 has an attachment channel 3 having a "+" shaped cross section. The attachment channel 3 has an elongated insertion groove 3A indented on an attachment surface 13 of the surfboard 1 and an engagement groove 3B perpendicular extended along the insertion groove 31 that divides the insertion groove 3A into an upper central groove 11 and a bottom groove 9 which form a top portion and a bottom portion of the "+" shaped attachment channel 3. Similarly, the engagement groove 3B is divided by the insertion groove 3A into a first side groove 5 and a second side groove 7 which form the cross of the "+" shaped attachment channel 3. Although various cross section shapes will suffice, in the preferred embodiment of the present invention the first side groove 5, the second side groove 7 and the bottom groove 9 are of generally rectangular cross section.

The central groove 11 begins at and is flush with the attachment surface 13 of surfboard 1 and terminates at the point where the first and second side grooves 5 and 7 begin. The attachment channel 3 and its grooves 5, 7, 9, and 11 run longitudinally within the surfboard body for a length of between 1 and 48 inches. As shown in FIG. 1, an industry standard fin 1A is illustrated that provides hydrodynamic stability and maneuverability to the surfboard in the water. The fin 1A has a forward edge 17, a trailing edge 19 and a pair of fin tangs 16.

Typical surfboard construction consists of a shaped, rigid foam core blank or body covered and sealed at its outer surface by fiber or fabric reinforced plastic such as fiberglass fabric and polyester resin. Industry practice is to secondarily form a fin box 10, for example, directly into the surfboard body by removing the outer surface and as much of the core as required. It is typical for either a fin box channel 13 to be formed directly into the foam core and the exposed core surfaces re-sealed with fiberglass and or polyester resin or alternatively a preformed fin box 10 including a fin box channel 13 is inserted into the removed foam core space and the preformed fin box set in place by fiberglass and or polyester resin. In these or any means of forming the fin box 10, standard shapes and dimensions for the fin box and channels are followed by manufacturers so that interchangeability of fins is achieved. In some instances, the fin box 10 is a feature introduced as a modification to the as-manufactured board which does not contain such a fin box feature.

Similarly, the non-water sportsboard devices, for instance a bicycle or skateboard, the "+" shaped or similar section feature recessed channel can be an integral feature or modification. Such non-water sportsboard devices may be constructed from similar materials to surfboards. Alternatively, where such devices are constructed of dissimilar materials, the device is similarly configured to incorporate features which will accept and engage the inventive apparatus as described herein.

Referring to FIGS. 2A to 3B, a sportsboard locking apparatus 20 is illustrated, which comprises a locking member 31 and an engagement member 53. The locking and engagement members 31 and 53 are shown in plan views in FIGS. 2A to 2C and shown in side views in FIGS. 3A and 3B for illustration of their respective features. As shown in FIGS. 2A and 3B, the engagement member 53 has an engaging latch 62 transversely formed at a foot end 57 thereof.

According to the preferred embodiment as shown in FIGS. 2A and 3B, the engagement member 53 is shaped to have a head end 55, a first edge 59, a second edge 61, an inner surface 63, an outer surface 65, a first shackle bore 68, and a first auxiliary shackle bore 66. The engagement member 53 is constructed to have an engaging channel 60 indented transversely on the outer surface 65 at a lower portion thereof so as to define the engaging latch 62 at the foot end 57, wherein the engaging channel 60 has a depth slightly smaller than a depth of the first or second side groove 5, 7 and a width slightly larger than a depth of the central groove 11, so that the engaging latch 62 relatively protrudes from a bottom surface of the indented engaging channel 60. Moreover, a thickness of the engagement member 53 must be smaller than a width of the insertion groove 3A and a height of the engaging latch 62 is slightly smaller than a height of the first or the second side groove 5, 7. Although any general shape and dimensional size which functions in the invention will suffice, in the preferred embodiment, the engagement member 53 is rectangular in shape having a short perimeter dimension of between ¼ to 4 inches, and a long perimeter dimension of between 1 to 8 inches, and a thickness which extends between the inner and outer surfaces 63 and 65 of between ¹⁄₁₆ to 2 inches.

Correspondingly, as shown in FIGS. 2B and 3A, the locking member 31 has an upper end 33, a lower end 35, a first edge 37, a second edge 39, an inner surface 41, an outer surface 43, a second shackle bore 49, and a second auxiliary shackle bore 51. Similarly, although any general shape and dimensional size which functions in the invention will suffice, in the preferred embodiment, the locking member 31 is rectangular in shape having short perimeter dimensions of between ¼ to 4 inches, long perimeter dimensions of between 1 to 8 inches, and a thickness between surfaces 41 and 43 of between ¹⁄₁₆ to 2 inches.

Figure 6:
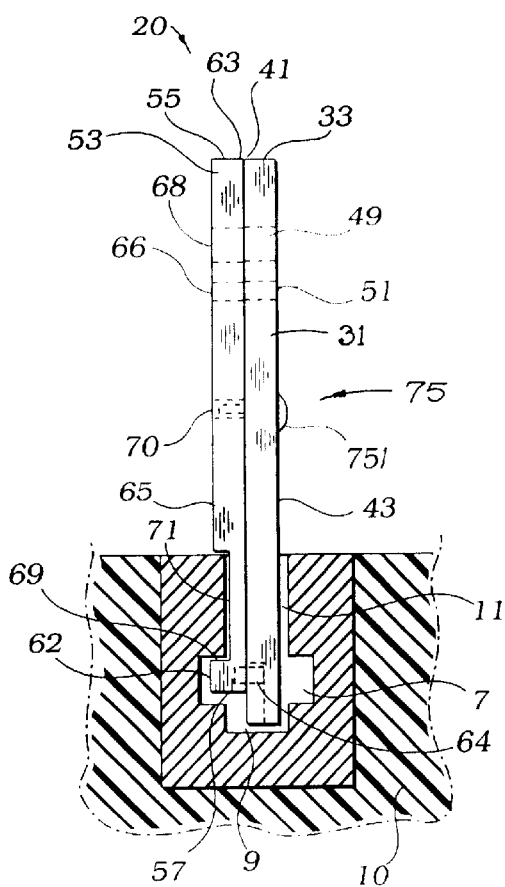
FIG. 6 is a side view of the sportsboard locking apparatus, wherein the locking member is slidably inserted into the second half of the "+" shaped attachment channel thereby fully engaging the fin box and the board's outer surface, according to the above preferred embodiment of the present invention.

The sportsboard locking apparatus 20 further comprises a means 75 for slidably attaching the locking member 31 to the engagement member 53 that limits the locking member 31 to move longitudinally with respect to the engagement member 53 between a locking position and an unlocking position. At the locking position, the locking member 31 is positioned overlappedly with the locking latch 62 so as to retain and lock the locking latch 62 inside the first or second side groove 5, 7 of the attachment channel 3, as shown in FIG. 6, by filling the insertion groove 3A with the lower portion of the locking member 31. By upwardly sliding the locking member 31 with respect to the engagement member 53 will move the locking member 31 to the unlocking position that the locking member 31 will be moved away from the insertion groove 3A so that the engagement member 53 is able to be removed from the attachment channel 3.

According to the preferred embodiment, the attachment means 75 comprises at least an attachment pin 751 and a guiding pin 64, such as rivets, bolts and mated male-female thread pair or equivalent means and structure, to work with an attachment slot 47 and a guiding slot 45 respectively. The engagement slot 47, which has an upper slot end 46 and a lower slot end 48, can be provided on either the attachment member 53 or the locking member 31, wherein when the attachment slot 47 is formed on the locking member 31 as embodied in FIG. 2B, the attachment pin 751 is affixed at a locating bore 70 provided on the engagement member 53 to penetrate through the attachment slot 47 so as to attach the locking member 31 with the engagement member 53 in such a manner that the locking member 31 is able to be slid longitudinally with respect to the engagement member 53.

Similarly, the guiding slot 45 can be provided on either the engagement member 53 or the locking member 31, wherein when the guiding slot 45 is as embodied to be formed at the lower end 35 of the locking member 31 and extended in parallel with the engagement slot 47 as shown in FIG. 2B, the guiding pin 64 is affixed and protruded from a corresponding corner of the foot end 57 on the inner surface 63 as shown in FIG. 2C, so that when the locking member 31 is moved to its locking position, the guiding pin 64 is inserted into the guiding slot 45 so as to guide the locking member 31 to longitudinally insert into the insertion groove 3A and limit any rotation or swinging movement with respect to the engagement member 53. Moreover, the guiding pin 64 also substantially limits the downwardly movement of the locking member 31 with respect to the engagement member 53 in such a manner that when the guiding pin 64 is moved to an stop end of the guiding slot 45, the locking member 31 is stopped and retained at the locking position as shown in FIGS. 6 and 7.

Figure 7:
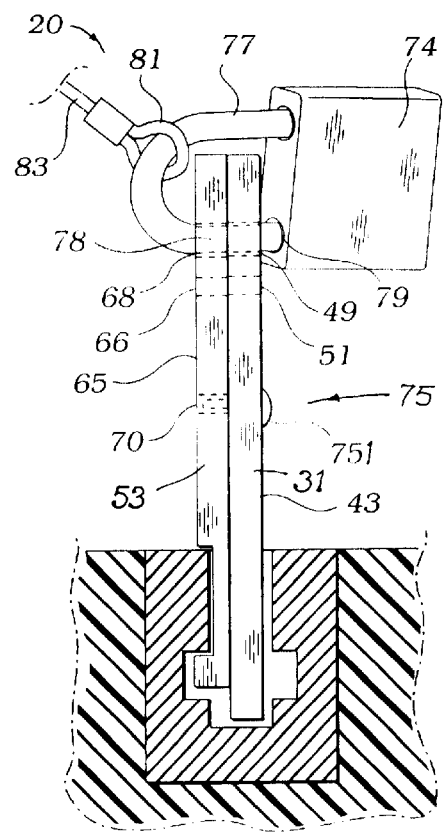
FIG. 7 is a side view illustrating both the engagement and locking members fully engaging the fin box and outer board surface and further being fixed in place by introduction of a padlock with shackle and security cable, according to the above preferred embodiment of the present invention.

The first and second shackle bores 68 and 49 and the first and second auxiliary shackle bores 66 and 51 are arranged to position on the engagement and locking members 53 and 31 at such a manner that the first and second shackle bores 68 and 49 as well as the first and second auxiliary shackle bores 66 and 51 will only coaxially align together to form a through shackle bore and a through auxiliary shackle bore when the locking member 31 is positioned at the locking position with respect to the engagement member 53 as shown in FIG. 6, so that the user may hook a shackle 77 of a standard padlock 74 therethrough as shown in FIG. 7. In other words, the user can ensure the sportsboard locking apparatus 20 being well-set in the locking position by simply checking whether the first and second shackle bores 68 and 49 are coaxially aligned with each other.

It is worth to mention that the guiding slot 45 can be omitted while the guiding pin 64 is affixed to a second locating bore 72 provided on the engagement member 53 and penetrated through the engagement slot 47 of the locking member 31, wherein the engaging pin 751 and the guiding pin 64 are spaced apart to not only limit any relative rotation between the engagement member 53 and the locking member 31 but also guide the locking member 31 to move between the locking position and the unlocking position with respect to the engagement member 43 by blocking the engaging pin 751 and the guiding pin 64 with upper and lower slot ends 46, 48 of the engagement slot 47 respectively.

According to the preferred embodiment, the engaging channel 60 which is located proximal to the foot end 57 defines a first side surface 67, a second side surface 69 and the bottom surface 71. The engaging channel 60 has a depth preferably in the range of 1/32 to 2 inches and extends across the short dimension or width of the engagement member 53 from the first edge 59 to the second edge 61 thereof. Referring to FIGS. 1 and 3B, the width of the engaging channel 60, from the side surface 69 to the side surface 67 along the bottom surface 71, is sized such that it is slightly larger than the depth of the central groove 11 of the insertion groove 3A or the distance from the attachment surface 13 of the surfboard to top edges of the first and second side grooves 5 and 7.

FIG. 3C illustrates an alternative mode of the engagement member 53' according to the preferred embodiment of the present invention and its features. Instead of indenting the engaging channel 60 on the outer surface 65 of the engagement member 53 as shown in FIG. 3B to form the engaging latch 62, the engaging latch 62' is protruded from the foot end 57' on the outer surface 65 of the engagement member 53'. In other words, the engaging channel 60' extends from a side surface 69' to a head end 55' of the engagement member 53, so that the outer surface 65' becomes the bottom surface 71' of the engaging channel 60'.

The guiding slot 45 located at lower end 35 and proximal to first edge 37 extends through the thickness of the locking member 31 from the inner surface 41 to the outer surface 43. Although any general shape and dimensional size which functions in the present invention will suffice, in the preferred embodiment, the guiding slot 45 is rectangular in shape, its short dimension of between 1/32 to 1/2 inches and its long dimension of between 1/8 to 2 inch, its long dimension running from the lower end 35 toward the upper end 33.

In an alternate embodiment of the invention, the guiding slot 45 does not extend through the thickness of locking member 31, rather the guiding slot 45 is essentially a channel or groove extending from the inner surface 41 having a depth into the thickness of locking member 31 but terminating prior to its depth reaching outer surface 43. This depth is sufficient for the guiding pin 64 to slide within the guiding channel or groove 45 when the inner surface 41 of the locking member 31 is in contact with the inner surface 63 of the engagement member 53. As mentioned above, the locking member 31 may not have the guiding slot 45 nor a channel or groove into its thickness.

The engagement slot 47 extends through the thickness of locking member 31 from the inner surface 41 to the outer surface 43 and centered equidistant between the first and second edges 37 and 39 and between the upper and lower ends 33 and 35. Although any general shape and dimensional size which functions in the present invention will suffice, in the preferred embodiment, the engagement slot 47 is rectangular in shape with the round shaped upper and lower slot ends 46 and 48 and with its short side being between 1/64 to 2 inch and its long side being between 1/8 to 6 inches, its long side running from the lower end 35 toward the upper end 33. In an alternate embodiment, the engagement slot 47 is not centered equidistant between the first and second edges 37 and 39 nor the upper and lower ends 33 and 35 but rather is off-centered toward either the first side 37 or the second side 39.

The second shackle bore 49 is located proximal to the upper end 33, centered equidistant between the first and second edges 37 and 39, and located between the upper slot ends 46 and the upper end 33. The second auxiliary shackle bore 51 is located proximal to the upper end 33 and the first edge 39 and between the upper slot end 46 and the upper end 33. Both the second shackle and auxiliary shackle bores 49 and 51 extend through the thickness of locking member 31 from the inner surface 41 to the outer surface 43 thereof. Although any general shape and dimensional size which functions in the invention will suffice, in the preferred embodiment, both second shackle bore 49 and the second auxiliary shackle bore 51 are circular with the second shackle bore 49 of diameter between ⅛ to 1 inch and the second auxiliary shackle bore 51 of diameter between 1/16 to ¾ inch.

In an alternative mode of the preferred embodiment, the second shackle bore 49 is not centered equidistant between first and second edges 37 and 39 but rather is off-centered to either the first side 37 or the second side 39. In a further embodiment, no second auxiliary shackle bore is contained in the locking member 31.

Although and general shape and dimensional size which functions in the present invention will suffice, in the preferred embodiment, the guiding pin 64 is preferably round and protrudes from the inner surface 63 of the engagement member 53 proximate to the lower end 57 where the lower end 57 meets the inner surface 41. The guiding pin 64 is sized such that its height of protrusion from the inner surface 63 would fit within the thickness of locking member 31 between its inner and outer surfaces 41 and 43 and sized such that a diameter or thickness of guiding pin 64 fits without interference into the short dimensions of guiding slot 45 of locking member 31, this dimension between 1/64 to ½ inch.

The guiding pin 64 is preferably a separate piece attached to the engagement member 53 through an attachment means 80 including but not limited to element-to-element welding, mating male-female threads, and adhesive bonding or equivalent structure. Alternatively, the guiding pin 64 may also be made as an integral element of the engagement member 53 as by machining, molding or similar method. In an alternative mode, the engagement member 53 does not have an element such as guiding pin 64. In this case, there are no coordination or tolerance issues with guiding slot 45 of the guiding member 31 when the locking and engagement members 31 and 53 mate nor where the locking member 31 has no guiding slot 45.

The first shackle bore 68 is centered equidistant between the first and second edges 59 and 61 of the engagement member 53 and proximal to the head end 55. The first auxiliary shackle bore 66 is located proximal to the head end 55 and proximal to the first edge 59. Both the first shackle and auxiliary shackle bores 68 and 66 extend from the inner surface 63 to the outer surface 65, or through the thickness of engagement member 53. The first shackle bore 68 and the first auxiliary shackle bore 66 are located on the engagement member 53 and sized such that when inner surfaces 63 and 41 are in intimate contact, and upper end 33 and the head end 55 and first edges 37 and 59 are aligned, the first shackle bore 68 and the second shackle bore 49 are concentric and the first auxiliary shackle bore 66 and the second auxiliary shackle bore 51 are concentric, respectively.

As with the first and second shackle bores 68, 49 and the first and second auxiliary shackle bores 66, 51 are preferably of circular cross section and are centered between first and second edges 59 and 61 or may be off-centered to either the first side 59 and the second side 61. In either case, the first shackle bore 68 and the first auxiliary shackle bore 66 location on the engagement member 53 must coincide with the respective locations of the second shackle bore 49 and the second auxiliary shackle bore 51 of the locking member 31. In an alternative mode, the engagement member 53 has no first auxiliary shackle bore 66 where the locking member 31 has no second auxiliary shackle bore 51.

At least one locating bore 70 is present in engagement member 53 centered equidistant between the first and second edges 59 and 61 and axially with the center of first shackle bore 68. Although any general shape and dimensional size which functions in the present invention will suffice, in the preferred embodiment, locating bore 70 is round with an identical diameter sized to be the same as the shorter dimension or width of the engagement slot 47 or between 1/16 to 2 inch. The locating bores 70, 72 extend from the inner and outer surface 63 to 65, or through the thickness of the engagement member 53, and are located from the first edge 59 such that when inner surfaces 63 and 41 are intimate, the upper end 33 and the head end 55 and first edges 37 and 59 are aligned, locating bores 70, 72 are aligned along and within a center of the engagement slot 47.

According to an alternative mode of the preferred embodiment, when the engagement slot 47 is not centered equidistant between first edges 37 and 39 of the locking member 31, similarly locating bores 70, 72 are not centered between first and second edges 59 and 61 of the engagement member 53. Rather, when the engagement slot 47 is more proximal to either the first edge 37 or the second edge 39, the locating bores 70, 72 must be proximal to their respective side such that the locating bores 70, 72 are aligned along and within the long dimension or length of engagement slot 47 as the locking member 31 and the engagement member 53 mate.

Figure 4:
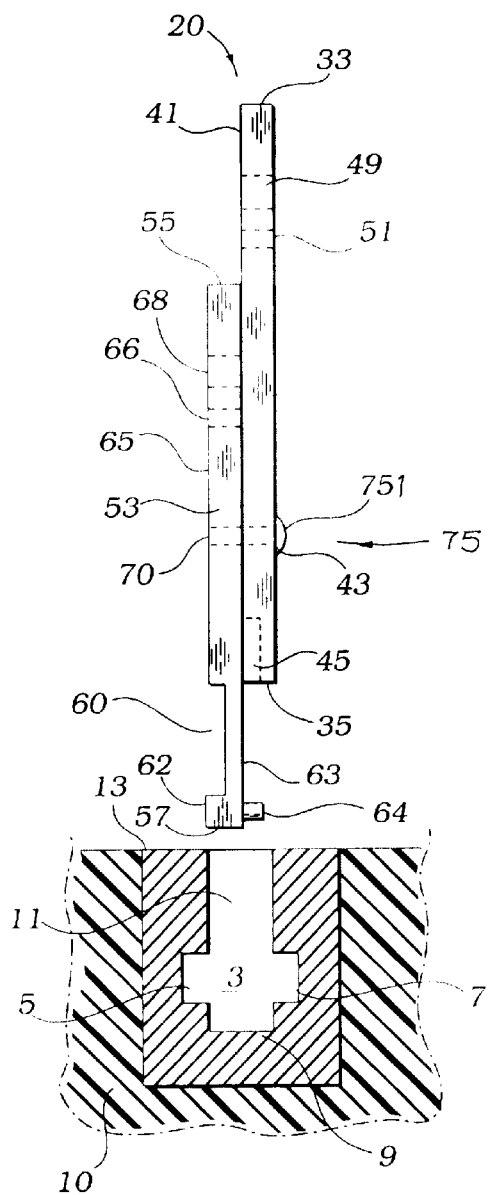
FIG. 4 is a side view of the sportsboard locking apparatus vertically proximal to, but un-engaged with, a "+" shaped attachment channel of a standard fin box, according to the above preferred embodiment of the present invention.

FIG. 4 illustrates a side view of the locking and engagement members 31 and 53 of the sportsboard locking apparatus 20 located with the inner surfaces 41 and 63 in intimate contact with each other, the sportsborad locking apparatus 20 shown above the fin box 10 and the attachment surface 13 of the surfboard 1.

The inner surface 41 of the locking member 31 and inner surface 63 of the engagement member 53 are shown in intimate contact in FIG. 4. The locking and engagement members 31 and 53 are slide-ably joined by the attachment means 75. In the preferred embodiment, the attachment means 75 comprises rivets, pins; nut and bolts pair, mated male-female thread pair or equivalent means and structure whereby the locking member 31 houses a portion of the attaching pin 751 and the enageement member 53 houses a portion of the attaching pin 751 such that the locking and engagment members 31 and 53 can slide relative to each other while joined by attachment means 75.

The attaching pins 751 are sized to fit the locating bores 70, 72 and the engagement slot 47. The attaching pin 75 locates through the engagement slot 47 of the locking member 31 and through the respective locating bore 70 of the engagement member 53. Thus, with the attaching pin 751 located through the locating bore 70 and the engagement slot 47, the locking and engagement members 31 and 53 are free to slide with respect to each other along their intimate inner surfaces 41 and 63 since the attachment means 75 engage the engagement member 53 through the locating bore 70 and engage the locking member 31 through the engagement slot 47.

Figure 5:
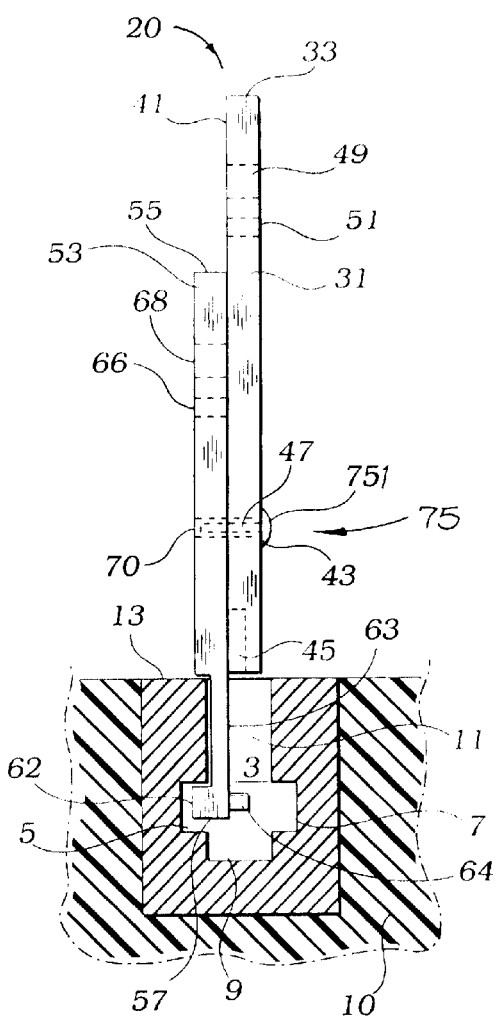
FIG. 5 is a side view of the sportsboard locking apparatus, wherein the engagement member is inserted into the standard fin box thereby engaging one half the "+" shaped attachment channel and the board's outer surface, according to the above preferred embodiment of the present invention.

In FIG. 5, as the sportsboard locking apparatus 20 is lowered toward the fin box 10, the engagement member 53 is first lowered vertically into the insertion groove 3A of the attachment channel 3 of the fin box 10 with the foot end 57 of the engagement member 53 engaged into one of the side grooves 5, 7 of the engaging groove 3B such that the engaging latch 62 is engaged in the side groove 5 of the engagement groove 3B, the bottom surface 71 is in contact with the side wall of the central groove 11 of the insertion groove 3A, and the side surface 67 is in contact with the attachment surface 13 of surfboard 1, as shown in FIG. 5. In the above mentioned alternative mode as shown in FIG. 3C, the side surface 67 is not present and does not contact the attachment surface 13 of the surfboard 1.

Referring to FIGS. 4, 5 and 6, the locking member 31 next slides along its inner surface 41 intimate with the inner surface 63 of engagement member 53 and vertically into the insertion groove 3A of the attachment channel 3 of the fin box 10. The guiding slot 45 of locking member 31 engages and secures the guiding pin 64 into the guiding slot 45 as the locking member 31 slides along the engagement member 53. In this position, the sportsboard lock apparatus 20 has firmly affixed itself within the fin box 10 by securely engaging the side groove 5 of the engagement groove 3B and the attachment surface 13 with the engagement member 53; the side grooves 5 and 9 of the engagement groove 3B with the locking member 31; and the central groove 11 of the insertion groove 3A with both the locking and engagement members 31 and 53.

As shown in FIG. 7, the standard padlock 74 having the shackle 77 and a housing 79 engages the sportsboard lock apparatus 20 by passing the shackle 77 through the second shackle bore 49 of the locking member 31 and through first shackle bore 68 of the engagement member 53. With the shackle 77 filling the first and second shackle bores 68, 49, the locking and engagement members 31 and 53 are fixedly engaged to the surfboard 1 and no longer able to slide relative to each other to become un-engaged from the surfboard 1. Alternatively, the shackle 77 can be passed through first and second auxiliary shackle bores 66 and 51 alone or in combination with first and second shackle bores 68 and 49. Additionally, a device other than a padlock and shackle can be placed through one or both bore sets 49 and 68 and 51 and 66 to fixedly sportsboard engage apparatus 20 to surfboard 1.

As shown in FIG. 7, prior to inserting a free end 78 of the shackle 77 into lock housing 79 thereby locking padlock 74, the shackle 77 is passed through at least one hooped end 81 of a security cable 83. The security cable 83 is comprised of single or multiple wires of metal or similarly performing cable known in the art for securing articles from theft or unwanted movement.

Figure 8:
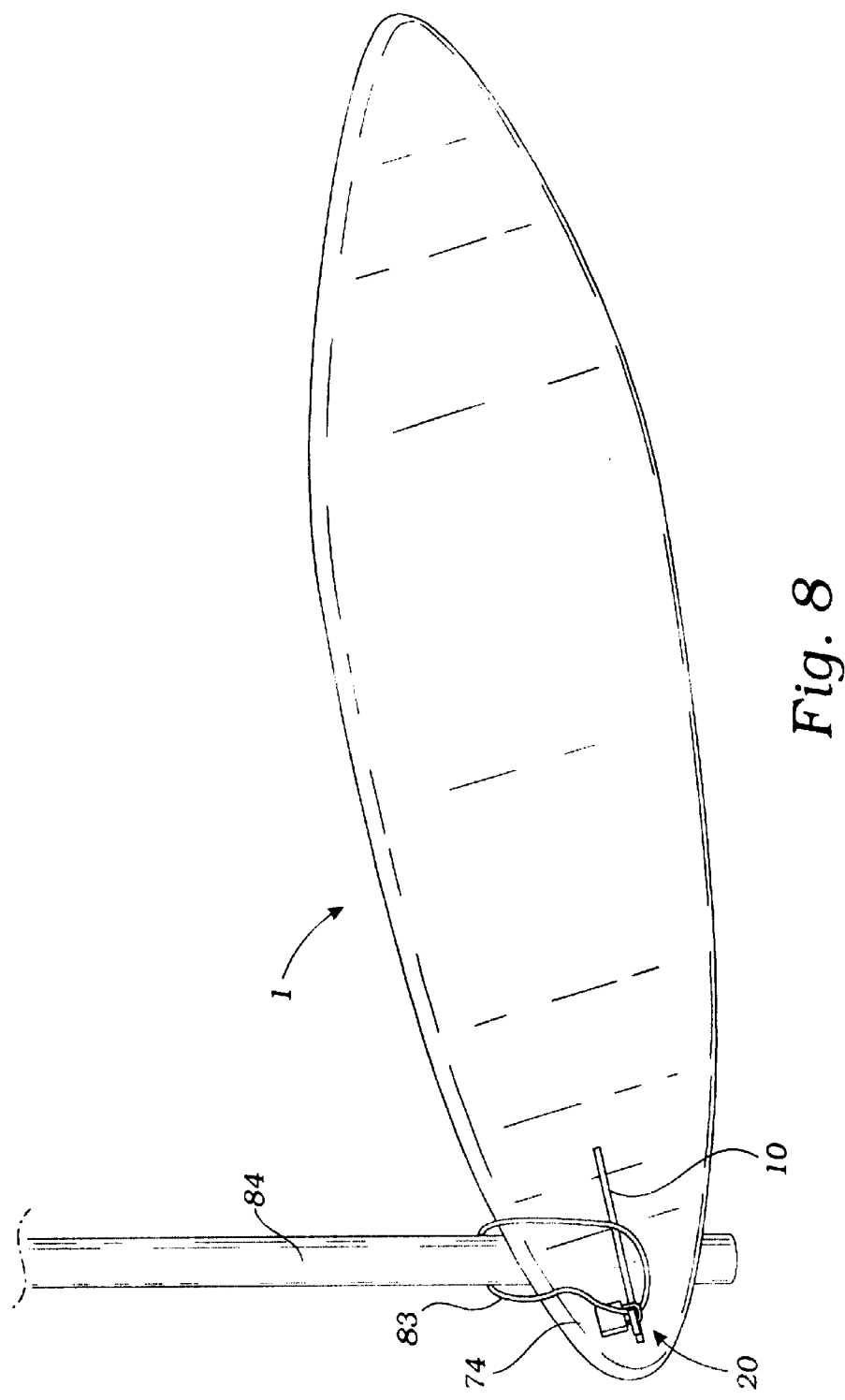
FIG. 8 is a perspective view of the sportsboard locking apparatus and surfboard illustrating a method for securing the sportsboard to a stationary article with the sportsboard locking apparatus according to the above preferred embodiment of the present invention.

As shown in FIG. 8, the length of the security cable 83 not engaged with the shackle 77 is attached to a stationary article such as a security post 84. Upon inserting the free end 78 into the lock housing 79, the security cable 83 connects the sportsboard lock apparatus 20 to the stationary article 85 thereby securing surfboard 1 from theft.

Thus, a method is described wherein a surfboard 1 having the fin box 10 and the fin box 13 features is fixedly and securely engaged by sportsboard locking apparatus 20 via its interaction with the standard padlock 74 and the shackle 77. Subsequent introduction of the security cable 83 having one or more hooped ends 81 facilitates securing the lock apparatus and board to a stationary article thereby providing a method of preventing theft of a surfboard.

The sportsboard locking apparatus 20 disclosed herein provides a positive engagement of surfboard 1. The engagement is initiated by consuming the cross-sectional space of the board's attachment channel 3 with the locking and engagement members 31 and 53 of the sportsboard locking apparatus 20. This positive engagement is completed when the locking and engagement members 31 and 53 accept the padlock shackle 77 or other security device which fills the pair of first and second shackle bores 68 and 49 and/or the first and second auxiliary shackle bores 66 and 51. When either or both of these bore pairs is filled, the locking and engagement members 31 and 53 are no longer able to slide relative to each other, thus fixing them into the fin box 10 and attachment channel 3. While the locking and engagement members 31 and 53 are fixed, removal of the attachment means 75 does not affect the secure engagement of the fin box 10 and the attachment channel 3 by the locking and engagement members 31 and 53.

Further, where the embodiment of the present invention contains the guiding pin 64 which coordinates and is accepted into guiding slot 45 as the locking member 31 slides vertically into attachment channel 3 of the fin box 10, the locking and engagement members 31 and 53 will not move relative to each other horizontally nor spin about the axis of locating bores 70 even when the attachment means 75 is removed. Thus, the present apparatus will firmly and securely engage the surfboard 1 even as vandals remove attachment means 75 which is exposed above the attachment surface 13.

The preferred embodiment of the apparatus described herein is comprised of few elements whose simple features interact with minimal reliance on close tolerance moving parts nor upon complex motion relative to each other, i.e. no spring loaded interactions nor toothed engagements. The interaction between elements is dominated by slidably joined locking and engagement members 31 and 53 which are dependent upon joining means 75 to secure these elements while permitting means 75 to travel along the engagement slot 47. Thus, the apparatus will not be adversely affected by the corrosive and abrasive nature of the environment in which surfboards are used, namely sand, dirt, salt water and moisture. Unlike deck plug type surfboard security devices, the present invention engages a more robust feature of the surfboard, the recessed fin box, thereby avoiding the "rocking" damage caused when attempting to dislodge such devices. The low part count, simple features and simple assembly also translate into low cost materials, manufacture and assembly costs while attaining product longevity.

Figure 9:
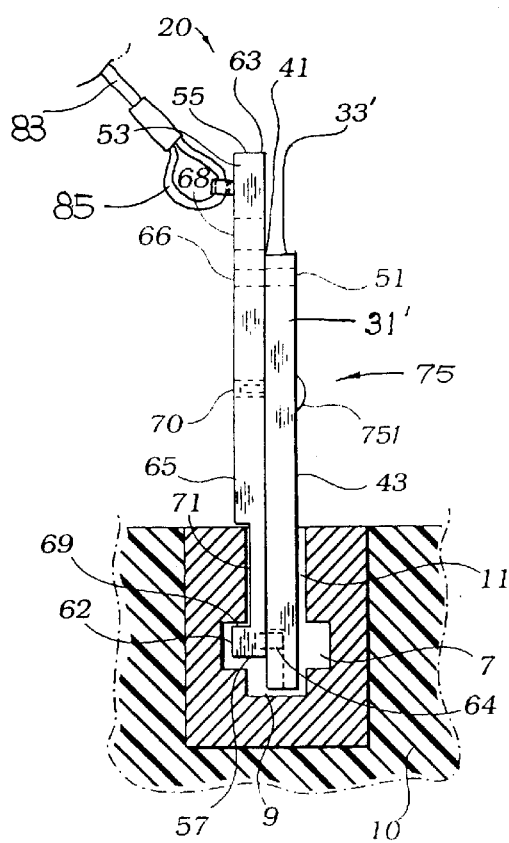
FIG. 9 is a side view illustrating an alternative mode of the sportsboard locking apparatus according to the above preferred embodiment of the present invention, wherein the locking member is slidably inserted into the second half of the "+" shaped attachment channel thereby fully engaging the fin box and the board's outer surface.
Figure 10:
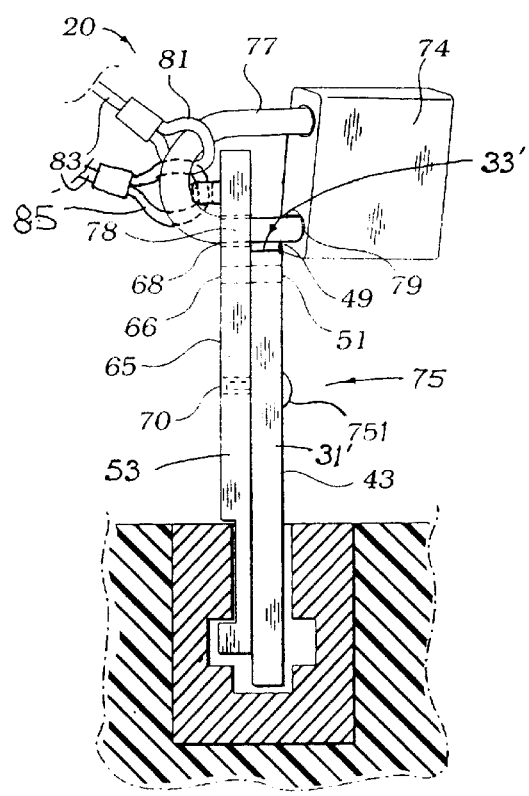
FIG. 10 is a side view illustrating the above alternative mode according to the above preferred embodiment of the present invention, wherein both the engagement and locking members fully engaging the fin box and outer board surface and further being fixed in place by introduction of a padlock with shackle and security cable.

Referring to FIGS. 9 and 10, an alternative mode of the sportsboard locking apparatus according to the above preferred embodiment of the present invention, which engagement member 53 has the same structure as the above preferred embodiment as shown in FIGS. 2A to 7, and the locking member 31' is modified to have a short length that the upper portion and the second shackle bore 49 thereon is eliminated. Therefore, at the locking position, as shown in FIG. 9, when the lower end of the locking member 31' is positioned overlappedly with the locking latch 62, the upper end 33' of the locking member 31' which acts as a blocking edge is positioned right below the first shackle bore 68, so that the shackle 77 of the padlock 74 passed through the first shackle bore 68 is extended across the upper end 33' of the locking member 31', as shown in FIG. 10, so as to block any upward movement of the locking member 31' with respect to the engagement member 53 and fixedly engage the engagement and locking members 53, 31' to the surfboard 1 and no longer able to slide relative to each other.

Moreover, as embodied in FIGS. 9 and 10, both the preferred embodiment as shown in FIGS. 2A to 7 and this alternative mode can be modified to have another end 85 of the security cable 83 been permanently connected to the engagement member 53, so that the user may simply lock the hooped end 81 of the security cable 83 with the sportsboard locking apparatus by means of the padlock 74 to assemble as a security locking system for the sportsboard.

What is claimed is:

1. A sportsboard locking apparatus for a sportsboard having an attachment channel having an elongated insertion groove indented on a surface of said sportsboard and an engagement groove perpendicular extended along said insertion groove, wherein said sportsboard locking apparatus comprises:

an engagement member having an engaging latch transversely formed at a foot end of an outer surface thereof and a first shackle bore, wherein a thickness of said engagement member is smaller than a width of said insertion groove and a height of said engaging latch is smaller than a height of said engagement groove, therefore said engagement member is capable of inserting into said insertion groove to engage said engaging latch in said engagement groove of said attachment channel of said sports board;

a locking member having a predetermined thickness and a second shackle bore; and means for slidably attaching said locking member to said engagement member that limits said locking member to move longitudinally with respect to said engagement member between a locking position and an unlocking position;

wherein at said locking position, a lower end of said locking member is positioned overlappedly with said locking latch while said first and second shackle bores are coaxially aligned with each other to form a through shackle bore for retaining and locking said locking latch inside said engagement groove of said attachment channel by filling said insertion groove with a lower portion of said locking member while said first and second shackle bores are exposed outside said attachment channel, wherein by upwardly sliding said locking member with respect to said engagement member moves said locking member to said unlocking position that said locking member is capable of moving away from said insertion groove so that said engagement member is able to be removed from said attachment channel;

wherein said engagement member is constructed to have an engaging channel indented transversely on said outer surface at a lower portion thereof so as to define said engaging latch at said foot end such that said engaging channel has a depth slightly smaller than a depth of said engagement groove and a width slightly larger than a distance between said attachment surface of said sportsboard and a top edge of said engagement groove so as to define a first side surface, a second side surface and a bottom surface thereof and thus said engaging latch relatively protrudes from said bottom surface of said engaging channel.

2. The sportsboard locking apparatus, as recited in claim 1, wherein said attachment means comprises at least an attaching pin affixed on an inner surface of said engagement member to equip with an elongated attachment slot, wherein said engagement slot, which has an upper slot end and a lower slot end, is longitudinally provided on said locking member and said attaching pin penetrates through said attachment slot so as to attach said locking member with said engagement member in such a manner that said locking member is able to be slid longitudinally with respect to said engagement member.

3. The sportsboard locking apparatus, as recited in claim 2, wherein said attachment means further comprises a guiding pin affixed on said inner surface of said engagement slot to equip with a guiding slot, wherein said guiding slot is formed at a lower end of said locking member and extended in parallel with said engagement slot, wherein said guiding pin is affixed and protruded from said foot end on said inner surface of said engagement member, wherein when said locking member is moved to said locking position, said guiding pin is inserted into said guiding slot for guiding said locking member to longitudinally insert into said insertion groove and limit any rotation movement with respect to said engagement member, wherein said guiding pin also substantially limits said downwardly movement of said locking member with respect to said engagement member in such a manner that when said guiding pin is moved to an stop end of said guiding slot, said locking member is stopped and retained at said locking position.

4. The sportsboard locking apparatus, as recited in claim 3, wherein said engagement member and said locking member further have a first and second auxiliary shackle bores provided therethrough respectively in such a manner that said first and second auxiliary shackle bores only coaxially align together to form a through auxiliary shackle bore when said locking member is positioned at said locking position with respect to said engagement member.

5. The sportsboard locking apparatus, as recited in claim 4, wherein an inner surface of said locking member and said inner surface of said engagement member are in intimate contact and slidably joined by said attachment means.

6. The sportsboard locking apparatus, as recited in claim 2, wherein said attachment means further comprises a guiding pin affixed on said inner surface of said engagement member and penetrated through said engagement slot of said locking member, wherein said engaging pin and said guiding pin are spaced apart to limit any relative rotation movement between said engagement member and said locking member and guide said locking member to move between said locking position and said unlocking position with respect to said engagement member by blocking said engaging pin and said guiding pin with said upper and lower slot ends of said engagement slot respectively.

7. The sportsboard locking apparatus, as recited in claim 6, wherein said engagement member and said locking member further have a first and second auxiliary shackle bores provided therethrough respectively in such a manner that said first and second auxiliary shackle bores only coaxially align together to form a through auxiliary shackle bore when said locking member is positioned at said locking position with respect to said engagement member.

8. The sportsboard locking apparatus, as recited in claim 6, wherein an inner surface of said locking member and said inner surface of said engagement member are in intimate contact and slidably joined by said attachment means.

9. A sportsboard locking apparatus for a sportsboard having an attachment channel having an elongated insertion groove indented on a surface of said sportsboard and an engagement groove perpendicular extended along said insertion groove, wherein said sportsboard locking apparatus comprises:

an engagement member having an engaging latch transversely formed at a foot end of an outer surface thereof and a first shackle bore, wherein a thickness of said engagement member is smaller than a width of said insertion groove and a height of said engaging latch is smaller than a height of said engagement groove, therefore said engagement member is capable of inserting into said insertion groove to engage said engaging latch in said engagement groove of said attachment channel of said sportsboard;

a locking member having a predetermined thickness and a second shackle bore; and means for slidably attaching said locking member to said engagement member that limits said locking member to move longitudinally with respect to said engagement member between a locking position and an unlocking position;

wherein at said locking position, a lower end of said locking member is positioned overlappedly with said locking latch while said first and second shackle bores are coaxially aligned with each other to form a through shackle bore for retaining and locking said locking latch inside said engagement groove of said attachment channel by filling said insertion groove with a lower portion of said locking member while said first and second shackle bores are exposed outside said attachment channel, wherein by upwardly sliding said locking member with respect to said engagement member moves said locking member to said unlocking position that said locking member is capable of moving away from said insertion groove so that said engagement member is able to be removed from said attachment channel;

wherein said engaging latch is protruded from said foot end on said outer surface of said engagement member, wherein an engaging channel extends from a side surface of said engaging latch to a head end of said engagement member, so that said outer surface becomes a bottom surface of said engaging channel.

10. The sportsboard locking apparatus, as recited in claim 9, wherein said attachment means comprises at least an attachment pin affixed on a inner surface of said engagement member to equip with an elongated attachment slot, wherein said engagement slot, which has an upper slot end and a lower slot end, is longitudinally provided on said locking member and said attachment pin penetrates through said attachment slot so as to attach said locking member with said engagement member in such a manner that said locking member is able to be slid longitudinally with respect to said engagement member.

11. The sportsboard locking apparatus, as recited in claim 10, wherein said attachment means further comprises a guiding pin affixed on said inner surface of said engagement slot to equip with a guiding slot, wherein said guiding slot is formed at a lower end of said locking member and extended in parallel with said engagement slot, wherein said guiding pin is affixed and protruded from said foot end on said inner surface of said engagement member, wherein when said locking member is moved to said locking position, said guiding pin is inserted into said guiding slot for guiding said locking member to longitudinally insert into said insertion groove and limit any rotation movement with respect to said engagement member, wherein said guiding pin also substantially limits said downwardly movement of said locking member with respect to said engagement member in such a manner that when said guiding pin is moved to an stop end of said guiding slot, said locking member is stopped and retained at said locking position.

12. The sportsboard locking apparatus, as recited in claim 11, wherein said engagement member and said locking member further have a first and second auxiliary shackle bores provided therethrough respectively in such a manner that said first and second auxiliary shackle bores only coaxially align together to form a through auxiliary shackle bore when said locking member is positioned at said locking position with respect to said engagement member.

13. The sportsboard locking apparatus, as recited in claim 11, wherein an inner surface of said locking member and said inner surface of said engagement member are in intimate contact and slidably joined by said attachment means.

14. The sportsboard locking apparatus, as recited in claim 10, wherein said attachment means further comprises a guiding pin affixed on said inner surface of said engagement member and penetrated through said engagement slot of said locking member, wherein said engaging pin and said guiding pin are spaced apart to limit any relative rotation movement between said engagement member and said locking member and guide said locking member to move between said locking position and said unlocking position with respect to said engagement member by blocking said engaging pin and said guiding pin with said upper and lower slot ends of said engagement slot respectively.

15. The sportsboard locking apparatus, as recited in claim 14, said engagement member and said locking member further have a first and second auxiliary shackle bores provided therethrough respectively in such a manner that said first and second auxiliary shackle bores only coaxially align together to form a through auxiliary shackle bore when said locking member is positioned at said locking position with respect to said engagement member.

16. The sportsboard locking apparatus, as recited in claim 14, wherein an inner surface of said locking member and said inner surface of said engagement member are in intimate contact and slidably joined by said attachment means.

17. A sportsboard locking apparatus for a sportsboard having an attachment channel having an elongated insertion groove indented on a surface of said sportsboard and an engagement groove perpendicular extended along said insertion groove, wherein said sportsboard locking apparatus comprises:

an engagement member having an engaging latch transversely formed at a foot end of an outer surface thereof and a shackle bore, wherein a thickness of said engagement member is smaller than a width of said insertion groove and a height of said engaging latch is smaller than a height of said engagement groove, therefore said engagement member is capable of inserting into said insertion groove to engage said engaging latch in said engagement groove of said attachment channel of said sportsboard;

a locking member having a predetermined thickness and a blocking edge; and means for slidably attaching said locking member to said engagement member that limits said locking member to move longitudinally with respect to said engagement member between a locking position and an unlocking position;

wherein at said locking position, a lower end of said locking member is positioned overlappedly with said locking latch while said blocking edge is positioned right below said shackle bore for retaining and locking said locking latch inside said engagement groove of said attachment channel by filling said insertion groove with a lower portion of said locking member while said first and second shackle bores are exposed outside said attachment channel, wherein by upwardly sliding said locking member with respect to said engagement member moves said locking member to said unlocking position that said locking member is capable of moving away from said insertion groove so that said engagement member is able to be removed from said attachment channel;

wherein said engagement member is constructed to have an engaging channel indented transversely on said outer surface at a lower portion thereof so as to define said engaging latch at said foot end such that said engaging channel has a depth slightly smaller than a depth of said engagement groove and a width slightly larger than a distance between said attachment surface of said sportsboard and a top edge of said engagement groove so as to define a first side surface, a second side surface and a bottom surface thereof and thus said engaging latch relatively protrudes from said bottom surface of said engaging channel.

18. The sportsboard locking apparatus, as recited in claim 17, wherein said attachment means comprises at least an attaching pin affixed on an inner surface of said engagement member to equip with an elongated attachment slot, wherein said engagement slot, which has an upper slot end and a lower slot end, is longitudinally provided on said locking member and said attaching pin penetrates through said attachment slot so as to attach said locking member with said engagement member in such a manner that said locking member is able to be slid longitudinally with respect to said engagement member.

19. The sportsboard locking apparatus, as recited in claim 18, wherein said attachment means further comprises a guiding pin affixed on said inner surface of said engagement slot to equip with a guiding slot, wherein said guiding slot is formed at a lower end of said locking member and extended in parallel with said engagement slot, wherein said guiding pin is affixed and protruded from said foot end on said inner surface of said engagement member, wherein when said locking member is moved to said locking position, said guiding pin is inserted into said guiding slot for guiding said locking member to longitudinally insert into said insertion groove and limit any rotation movement with respect to said engagement member, wherein said guiding pin also substantially limits said downwardly movement of said locking member with respect to said engagement member in such a manner that when said guiding pin is moved to an stop end of said guiding slot, said locking member is stopped and retained at said locking position.

20. The sportsboard locking apparatus, as recited in claim 19, wherein an inner surface of said locking member and said inner surface of said engagement member are in intimate contact and slidably joined by said attachment means.

21. The sportsboard locking apparatus, as recited in claim 18, wherein said attachment means further comprises a guiding pin affixed on said inner surface of said engagement member and penetrated through said engagement slot of said locking member, wherein said engaging pin and said guiding pin are spaced apart to limit any relative rotation movement between said engagement member and said locking member and guide said locking member to move between said locking position and said unlocking position with respect to said engagement member by blocking said engaging pin and said guiding pin with said upper and lower slot ends of said engagement slot respectively.

22. The sportsboard locking apparatus, as recited in claim 21, wherein an inner surface of said locking member and said inner surface of said engagement member are in intimate contact and slidably joined by said attachment means.

23. A sportsboard locking apparatus for a sportsboard having an attachment channel having an elongated insertion groove indented on a surface of said sportsboard and an engagement groove perpendicular extended along said insertion groove, wherein said sportsboard locking apparatus comprises:

an engagement member having an engaging latch transversely formed at a foot end of an outer surface thereof and a shackle bore, wherein a thickness of said engagement member is smaller than a width of said insertion groove and a height of said engaging latch is smaller than a height of said engagement groove, therefore said engagement member is capable of inserting into said insertion groove to engage said engaging latch in said engagement groove of said attachment channel of said sportsboard;

a locking member having a predetermined thickness and a blocking edge; and means for slidably attaching said locking member to said engagement member that limits said locking member to move longitudinally with respect to said engagement member between a locking position and an unlocking position;

wherein at said locking position, a lower end of said locking member is positioned overlappedly with said locking latch while said blocking edge is positioned right below said shackle bore for retaining and locking said locking latch inside said engagement groove of said attachment channel by filling said insertion groove with a lower portion of said locking member while said first and second shackle bores are exposed outside said attachment channel, wherein by upwardly sliding said locking member with respect to said engagement member moves said locking member to said unlocking position that said locking member is capable of moving away from said insertion groove so that said engagement member is able to be removed from said attachment channel;

wherein said engaging latch is protruded from said foot end on said outer surface of said engagement member, wherein an engaging channel extends from a side surface of said engaging latch to a head end of said engagement member, so that said outer surface becomes a bottom surface of said engaging channel.

24. The sportsboard locking apparatus, as recited in claim 23, wherein said attachment means comprises at least an attachment pin affixed on a inner surface of said engagement member to equip with an elongated attachment slot, wherein said engagement slot, which has an upper slot end and a lower slot end, is longitudinally provided on said locking member and said attachment pin penetrates through said attachment slot so as to attach said locking member with said engagement member in such a manner that said locking member is able to be slid longitudinally with respect to said engagement member.

25. The sportsboard locking apparatus, as recited in claim 24, wherein said attachment means further comprises a guiding pin affixed on said inner surface of said engagement slot to equip with a guiding slot, wherein said guiding slot is formed at a lower end of said locking member and extended in parallel with said engagement slot, wherein said guiding pin is affixed and protruded from said foot end on said inner surface of said engagement member, wherein when said locking member is moved to said locking position, said guiding pin is inserted into said guiding slot for guiding said locking member to longitudinally insert into said insertion groove and limit any rotation movement with respect to said engagement member, wherein said guiding pin also substantially limits said downwardly movement of said locking member with respect to said engagement member in such a manner that when said guiding pin is moved to an stop end of said guiding slot, said locking member is stopped and retained at said locking position.

26. The sportsboard locking apparatus, as recited in claim 25, wherein an inner surface of said locking member and said inner surface of said engagement member are in intimate contact and slidably joined by said attachment means.

27. The sportsboard locking apparatus, as recited in claim 24, wherein said attachment means further comprises a guiding pin affixed on said inner surface of said engagement member and penetrated through said engagement slot of said locking member, wherein said engaging pin and said guiding pin are spaced apart to limit any relative rotation movement between said engagement member and said locking member and guide said locking member to move between said locking position and said unlocking position with respect to said engagement member by blocking said engaging pin and said guiding pin with said upper and lower slot ends of said engagement slot respectively.

28. The sportsboard locking apparatus, as recited in claim 27, wherein an inner surface of said locking member and said inner surface of said engagement member are in intimate contact and slidably joined by said attachment means.

* * * * *